Dec. 19, 1950  H. J. STEWART  2,534,386
UPENDING TRACTOR SEAT

Filed Feb. 21, 1949  2 Sheets-Sheet 1

INVENTOR.
H. J. STEWART
BY J. Ledermann
ATTORNEY

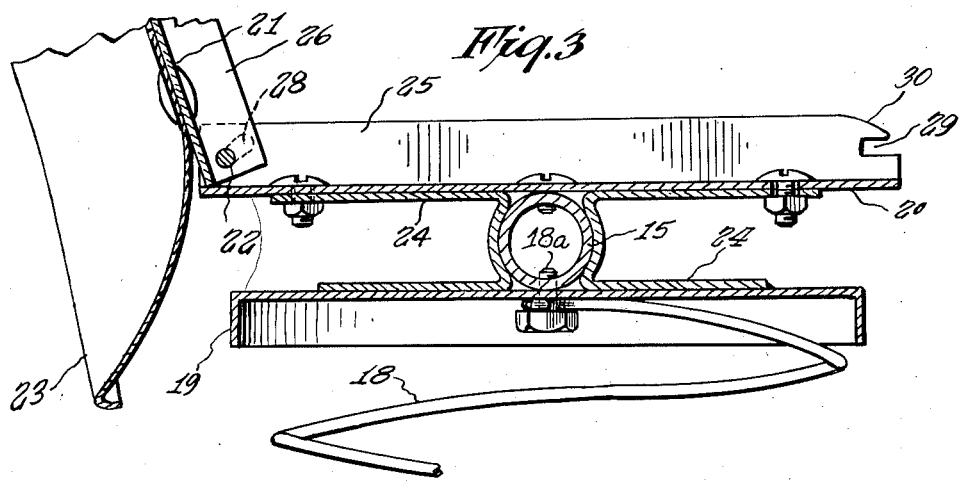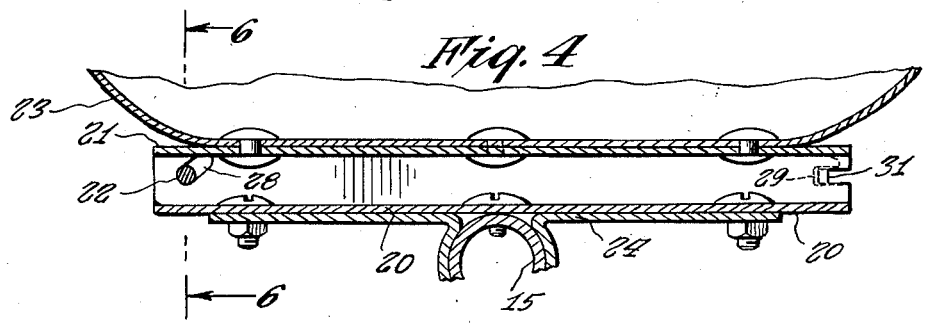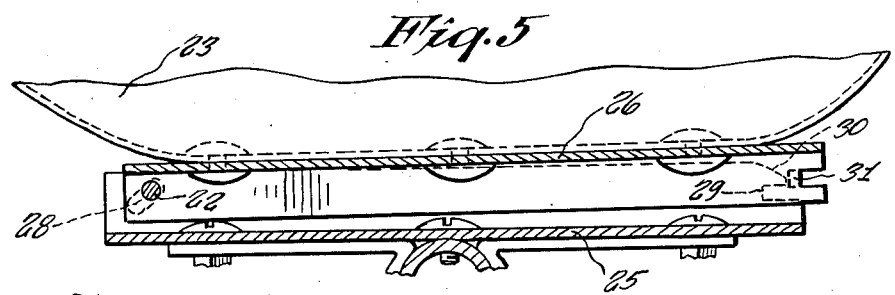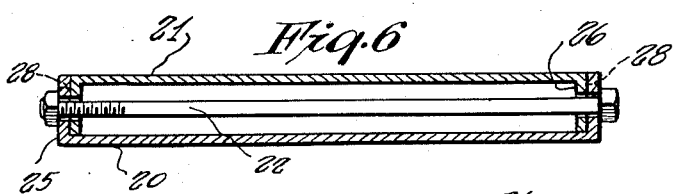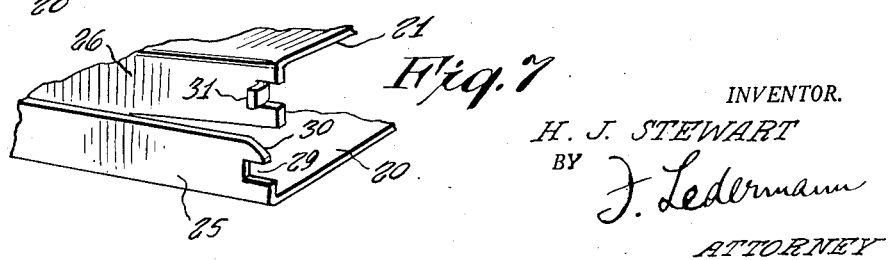

Patented Dec. 19, 1950

2,534,386

UNITED STATES PATENT OFFICE 2,534,386

UPENDING TRACTOR SEAT

Harry J. Stewart, Tripoli, Iowa

Application February 21, 1949, Serial No. 77,457

6 Claims. (Cl. 155—51)

1

This invention relates to upending tractor seat hinges, and aims to provide certain new and useful improvements whereby the seat may be readily turned back out of the way when not in use so that, for example, the driver may stand without obstruction by the tractor platform.

Another object of the invention is the provision of a tractor seat adapted to be turned back as above mentioned and having novel and practical means for supporting the seat in turned back position.

Still another object of the invention is the provision of a tractor seat having, in addition to the above features, means for releasably retaining the seat in its normal position.

The above as well as additional objects will be clarified in the following description, wherein characters of reference refer to like-numbered parts in the accompanying drawings. It is to be noted that the drawings are intended solely for the purpose of illustration, and that it is therefore neither desired nor intended to limit the invention necessarily to any or all of the exact details of construction shown except insofar as they may be deemed essential to the invention.

Referring briefly to the drawings, Fig. 1 is a fragmentary perspective view of a tractor seat having the improvements embodied in this invention applied thereto, showing the seat swung out of the way.

Fig. 3 is a sectional view taken on the line 3—3 of Fig. 1.

Fig. 4 is a sectional view taken on the line 4—4 of Fig. 2.

Fig. 5 is a view similar to Fig. 4, showing, however, the hinged seat plate in an intermediate position.

Fig. 6 is a sectional view taken on the line 6—6 of Fig. 4.

Fig. 7 is a fragmentary perspective view of the right-hand end of Fig. 5 with the hinged seat panel shown in another intermediate position.

Figure 1:
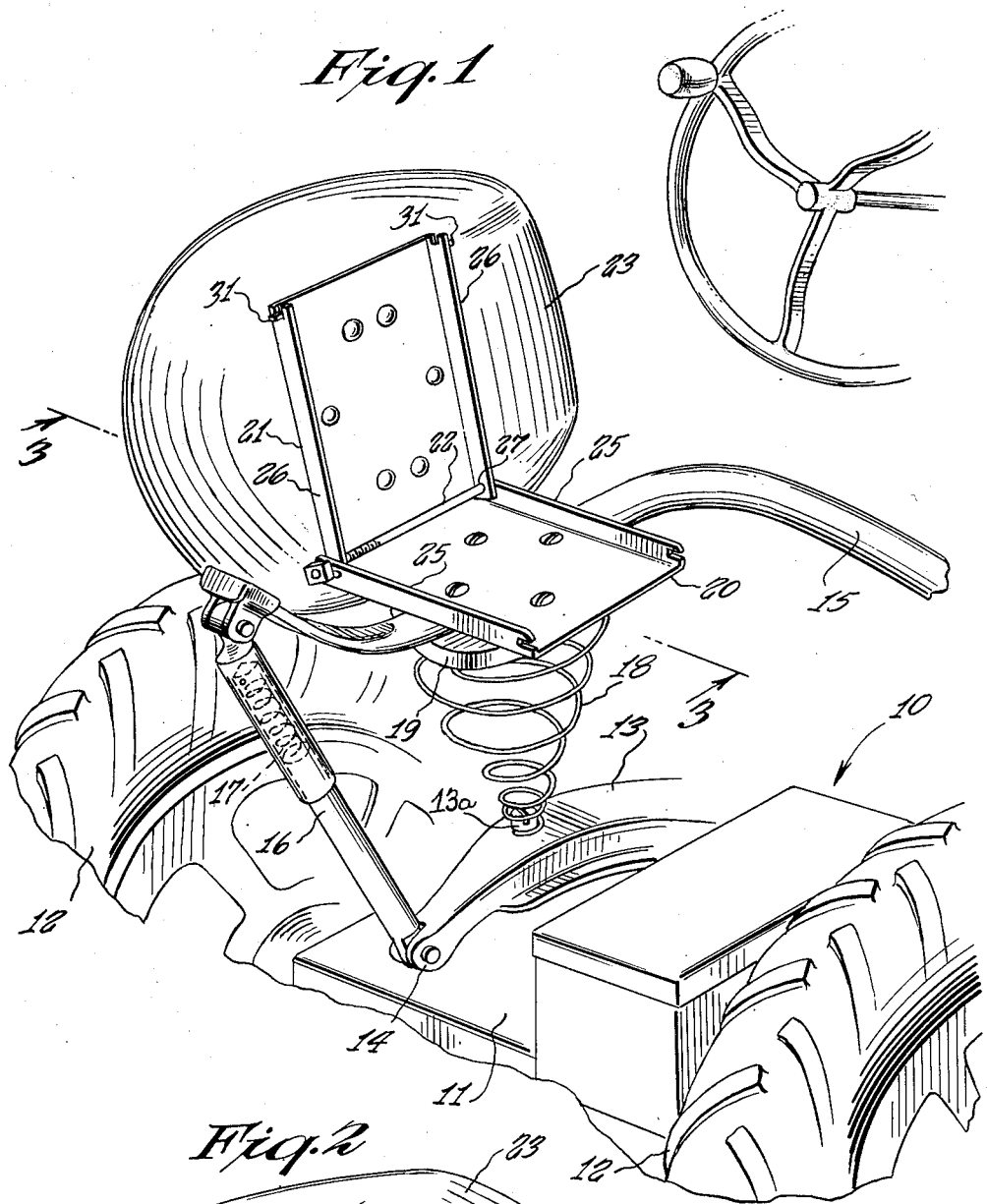

Referring in detail to the drawings, the numeral 10 indicates a tractor having a portion of the chassis thereof shown at 11 between the wheels 12. A curved arm or support 13 extends from a forward portion of the chassis or frame, not shown, to which it is rigid, in a rearward direction over the portion 11 and has its rearward extremity 14 free. Also extending rearward from the forward portion of the frame to which it is

2 either rigid or hinged, not shown, is a second and approximately S-shaped bar 15 which lies in the same vertical plane as the bar 13 and which is readily moveable, except for its forward end, not shown, in the said vertical plane. The bar 15 extends rearward farther than the bar 13. Pivoted at its extremities to the free ends of the bars 13 and 15 is a telescopic housing 16 adapted to contain a coiled spring 17 normally urging the housing to expand lengthwise or adapted to contain air under compression and thus likewise normally urging outward expansion of the housing. Thus, the housing 16 serves as a shock absorber.

A spiral spring 18 has its lower end secured, as by a screw bolt 13a, to the lower bar 13 and has its upper end secured, as by a screw bolt 18a, to a horizontal disc 19 bolted to the bar 15 intermediate the length of the latter. The seat embodying this invention comprises a pair of rigid plates 20 and 21 hinged together at one side edge on a pin 22, the former plate being bolted to the bar 15 and the latter plate having the shaped seat 23 bolted thereto. Reinforcing U-shaped brackets 24 may be provided between the disc 19 and the plate 20, as shown in Fig. 3.

The plate 20 is provided with upstanding front and rear walls 25, and the plate 21 with similar walls 26, the lengths of the two plates being such that the plate 21 with its walls 26 is adapted to fold down close against the plate 20 with the walls 26 of the former between the walls 25 of the latter. The pin 22 registers snugly in openings 27 through the walls 26 and passes through concentric or aligned slots 28 in the walls 25, these slots extending diagonally, substantially as shown. Aligned cut-outs 29 are provided in the forward extremities of the walls 25, and the corners of the latter are cut away at an angle or beveled, as shown in Fig. 3, to provide cam-like noses 30. Pegs 31 project in alignment from the forward extremities of the walls 26 and are adapted to register in the cut-outs 29, as will be more clearly set forth below.

Figure 2:
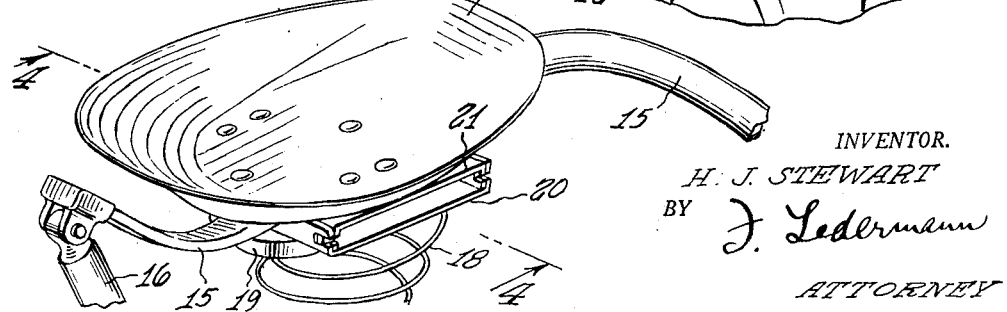
Fig. 2 is a fragmentary perspective view of the seat and its associated parts, showing the seat in normal position.

The seat 23 is normally in the position shown in Fig. 2 so that the driver may sit on it, and when he desires to stand at the elevation of the tractor platform, he swings the seat and the upper plate 21 to which it is attached, about the axis of the pin 22 into the position shown in Fig. 1. When the seat is in the normal position shown in Fig. 2, the plates 20 and 21 are in their respective positions shown in Fig. 4, that is, with the pin 22 in the rear and lowermost position in the slots 28 and the pegs 31 registering in the cut-outs 29. In order to swing the seat into the position shown in Fig. 1, the seat and hence the plate 21 is pulled to the right, Fig. 4, into the position shown in Fig. 5, this withdrawing the pegs 31 from the cut-outs 29 and advancing the pin 22 to the forward ends of the slots 28. The forward end of the seat, or rather the right-hand end of the seat, is then swung upward into the position of Fig. 1. To return the seat to its normal position, it is simply forcibly swung back, and during its return the pegs 31 will ride over the noses 30 into the cut-outs 29 while the pin 22 moves forward and upward in the slots 28. The seat may then be pushed toward the left, but actually, owing to the slope of the slots 28, as the pegs 31 align with the cut-outs 29 the plate 21 will slide to the left, Figs. 4 and 5. Thus, the seat is securely and releasably locked in its normal position.

After the seat has been swung into the position shown in Fig. 1, as clearly seen in Fig. 3, the lower edge of the plate 21 contacts the rear end of the plate 20 and is stopped thereby and thus prevented from swinging beyond the position shown.

It is apparent from the above that a new and improved pivoted or hinged seat for tractors has been provided, which attains the objectives of the invention.

Obviously, modifications in form or structure may be made without departing from the spirit or scope of the invention.

I claim:

1. In combination with a vehicle having a seat support thereon, a plate secured in substantially horizontal position on said support, a second plate hinged to said first plate on an axis substantially longitudinally with respect to the vehicle, a seat on said second plate, said second plate being normally positioned substantially horizontally and against said first plate and being adapted to be swung about said axis through an arc of at least ninety degrees, and said plates providing limit stop means for limiting the length of said arc.

2. The combination set forth in claim 1, said plates having means for mutually interlocking the same in the normally horizontal position of said second plate.

3. A seat comprising a support, a plate secured to said support in substantially horizontal position, said plate having opposed upstanding walls on the front and rear edges thereof, a second plate having opposed front and rear walls extending from opposed edges thereof, the distance between said walls of said second plate being less than the distance between said walls of said first plate, said second plate having substantially circular aligned openings through the said walls thereof near one end of the plate, said first plate having aligned diagonal slots through the said walls thereof near one end of the plate, a hinge pin passing through said openings and said slots with said walls of said second plate registering between said walls of said first plate thereby hinging said plates together at one end, the forward extremities of said walls of said first plate having aligned cut-outs therein, the forward extremities of said walls of said second plate having aligned pegs extending outward therefrom and adapted to register in said aligned cut-outs when said second plate is folded down upon said first plate thereby mutually interlocking said plates.

4. The seat set forth in claim 3 wherein said plates provide stop means for limiting the arc of movement of said second plate with respect to said first plate when said second plate is swung out of said folded down position thereof.

5. The seat set forth in claim 3, the forward extremities of said walls of said first plate having the upper corners thereof beveled thereby providing cam-like noses for said pegs to ride on while said second plate is being folded down into interlocking position with respect to said first plate.

6. The seat set forth in claim 3, the distance between said circular openings and said one end of said second plate and the distance between the bases of said slots and said first plate both being such that upon swinging said second plate through an arc of at least ninety degrees the said one end of said second plate meets said first plate thereby providing a limit stop to the said swinging of said second plate.

HARRY J. STEWART.

REFERENCES CITED

The following references are of record in the file of this patent:

UNITED STATES PATENTS

| Number | Name | Date |
|---|---|---|
| 533,300 | Josselyn | Jan. 29, 1895 |
| 709,619 | Wangerin | Sept. 23, 1902 |
| 895,042 | Rogers | Aug. 4, 1908 |
| 2,269,968 | Baker | Jan. 13, 1942 |